US010226870B1

(12) United States Patent
Silva et al.

(10) Patent No.: US 10,226,870 B1
(45) Date of Patent: *Mar. 12, 2019

(54) YAW SLIP HANDLING IN A ROBOTIC DEVICE

(71) Applicant: Boston Dynamics, Inc., Waltham, MA (US)

(72) Inventors: Marco Da Silva, Arlington, MA (US); Kevin Blankespoor, Arlington, MA (US); Michael Scott Rose, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/450,977

(22) Filed: Mar. 6, 2017

Related U.S. Application Data

(63) Continuation of application No. 15/145,773, filed on May 3, 2016, now Pat. No. 9,623,568, which is a continuation of application No. 14/554,951, filed on Nov. 26, 2014, now Pat. No. 9,352,470.

(60) Provisional application No. 62/078,382, filed on Nov. 11, 2014.

(51) Int. Cl.
| | |
|---|---|
| B25J 13/08 | (2006.01) |
| B62D 57/032 | (2006.01) |
| G05D 1/08 | (2006.01) |
| B25J 9/00 | (2006.01) |
| G01C 19/5705 | (2012.01) |

(52) U.S. Cl.
CPC .......... *B25J 13/088* (2013.01); *B25J 9/0003* (2013.01); *B25J 13/085* (2013.01); *B62D 57/032* (2013.01); *G01C 19/5705* (2013.01); *G05D 1/0891* (2013.01); *G05D 2201/0217* (2013.01); *Y10S 901/01* (2013.01)

(58) Field of Classification Search
CPC ........ B25J 13/088; B25J 9/0003; G05B 13/02
See application file for complete search history.

(56) References Cited

U.S. PATENT DOCUMENTS

| 6,898,485 | B2* | 5/2005 | Kuroki | B62D 57/032 318/568.11 |
| 7,031,806 | B2* | 4/2006 | Kuroki | B62D 57/032 318/568.1 |
| 7,379,789 | B2* | 5/2008 | Takenaka | B62D 57/032 318/568.1 |
| 7,664,569 | B2* | 2/2010 | Shimizu | B62D 57/032 318/568.11 |
| 8,005,573 | B2* | 8/2011 | Takenaka | B62D 57/032 700/245 |

(Continued)

Primary Examiner — Alex C Dunn
(74) Attorney, Agent, or Firm — Honigman LLP

(57) ABSTRACT

An example method may include determining a requested yaw for a body of a robot, where the biped robot comprises a foot coupled to the body via a leg. The robot may then detect, via one or more sensors, a yaw rotation of the body with respect to a ground surface, where the foot is in contact with the ground surface. Based on the detected yaw rotation of the body, the robot may determine a measured yaw for the body. The robot may also determine a target yaw for the body, where the target yaw for the body is between the measured yaw for the body and the requested yaw for the body. The robot may then cause the foot to rotate the body to the target yaw for the body.

18 Claims, 9 Drawing Sheets

(56) References Cited

U.S. PATENT DOCUMENTS

| | | | | |
|---|---|---|---|---|
| 9,043,029 | B2* | 5/2015 | Seo | B62D 57/032 |
| | | | | 700/245 |
| 9,352,470 | B1* | 5/2016 | da Silva | B25J 13/088 |
| 9,623,568 | B1* | 4/2017 | da Silva | B25J 13/088 |
| 2003/0120388 | A1* | 6/2003 | Kuroki | B62D 57/032 |
| | | | | 700/245 |
| 2005/0067993 | A1* | 3/2005 | Kato | B25J 19/0091 |
| | | | | 318/568.12 |
| 2005/0156551 | A1* | 7/2005 | Takenaka | B25J 13/088 |
| | | | | 318/568.12 |
| 2005/0165507 | A1* | 7/2005 | Shimizu | B62D 57/032 |
| | | | | 700/245 |
| 2006/0173578 | A1* | 8/2006 | Takenaka | B62D 57/032 |
| | | | | 700/245 |
| 2006/0247800 | A1* | 11/2006 | Takenaka | B62D 57/032 |
| | | | | 700/54 |
| 2011/0172823 | A1* | 7/2011 | Kim | B62D 57/032 |
| | | | | 700/260 |
| 2011/0178636 | A1* | 7/2011 | Kwon | B62D 57/032 |
| | | | | 700/253 |
| 2011/0231050 | A1* | 9/2011 | Goulding | B62D 57/024 |
| | | | | 701/26 |
| 2012/0158181 | A1* | 6/2012 | Seo | B62D 57/032 |
| | | | | 700/261 |

* cited by examiner

YAW SLIP HANDLING IN A ROBOTIC DEVICE

RELATED APPLICATIONS

This application is a continuation of and claims priority to U.S. patent application Ser. No. 15/145,773, filed on May 3, 2016, which claims the benefit of priority from U.S. patent application Ser. No. 14/554,951, filed on Nov. 26, 2014, which claims the benefit of priority from U.S. Provisional Application No. 62/078,382 filed Nov. 11, 2014, each of which is hereby incorporated by reference herein in its entirety.

GOVERNMENT LICENSE RIGHTS

This invention was made with government support under W91CRB-11-C-0047 and HR00011-10-C-0025 awarded by the Defense Advanced Research Projects Agency. The government has certain rights in the invention.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to controlling a legged robot. Specifically, implementations described herein may allow for efficient operation of a legged robot that encounters a slip or other disturbance to its gait in the yaw direction. These as well as other aspects, advantages, and alternatives will become apparent to those of ordinary skill in the art by reading the following detailed description, with reference where appropriate to the accompanying drawings.

A first example implementation may include (i) determining a force allocation for a foot of a biped robot, where the biped robot further includes a body coupled to the foot via a leg, (ii) determining a yaw rotation of the body with respect to a ground surface, where the foot is in contact with the ground surface, (iii) based on the determined yaw rotation of the body, updating the determined force allocation for the foot, and (iv) causing the foot to act on the ground surface based on the updated force allocation for the foot.

A second example implementation may include (i) determining a requested yaw for a body of a biped robot, where the biped robot includes a foot coupled to the body via a leg, (ii) determining a yaw rotation of the body with respect to a ground surface, where the foot is in contact with the ground surface, (iii) based on the determined yaw rotation of the body, determining a measured yaw for the body, (iv) determining a target yaw for the body, where the target yaw for the body is between the measured yaw for the body and the requested yaw for the body, (v) causing the foot to rotate the body to the target yaw for the body.

A third example implementation may include a system having means for performing operations in accordance with the first example implementation.

A fourth example implementation may include a system having means for performing operations in accordance with the second example implementation.

A fifth example implementation may include a biped robot having (i) a body, (ii) a foot coupled to the body via a leg, (iii) a processor; (iv) a non-transitory computer readable medium; and (v) program instructions stored on the non-transitory computer readable medium that, when executed by the processor, cause the biped robot to perform operations in accordance with the first example implementation.

A sixth example implementation may include a biped robot having (i) a body, (ii) a foot coupled to the body via a leg, (iii) one or more sensors, (iv) a processor; (v) a non-transitory computer readable medium; and (vi) program instructions stored on the non-transitory computer readable medium that, when executed by the processor, cause the biped robot to perform operations in accordance with the second example implementation.

DETAILED DESCRIPTION

Figure 1:
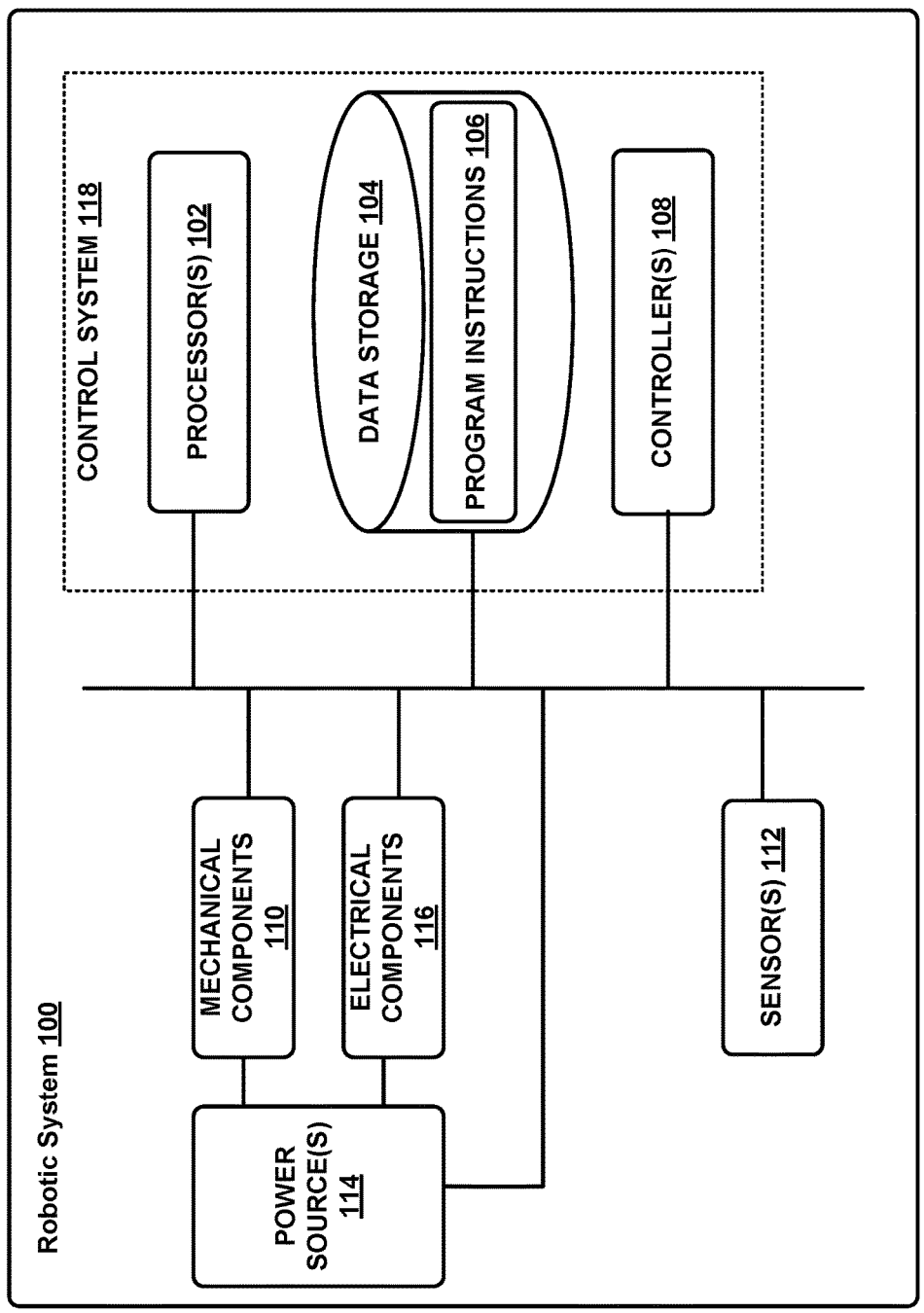
FIG. 1 illustrates a configuration of a robotic system, according to an example implementation.

Example apparatuses, systems and methods are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. OVERVIEW

Example implementations relate to handling yaw slips of a legged robot, which are slips of the robot's foot with respect to the ground surface resulting in a rotation about the vertical axis. The handling of yaw slips may include updating a force allocation for a foot of the robot based on a determined yaw rotation of the robot's body. The yaw slip handling may additionally or alternatively include moderating the robot's reaction to yaw slips by determining a target yaw for the body of the robot.

For a given step in the gait of a robot, the robot may determine a force allocation for its foot. The force allocation may determine a vertical force on the foot, shear forces between the foot and a ground surface in the forward and lateral directions, and a yaw moment for the foot with respect to the hip of the robot. Each of these component forces may be allocated based on the current requirements of the robot to support the robot's weight, correct any detected gait errors (e.g., slips, collisions, etc.), and to generally maintain the robot's posture and balance.

In some examples, the robot may determine via sensor data that its foot has slipped in the yaw direction, in the form of a yaw rotation, with respect to the ground surface. This may result in a change to the heading of the robot, and it may be desirable to correct the yaw rotation. However, if the robot's foot is slipping with respect to the ground surface in the yaw direction, it may indicate that there is not sufficient friction for the foot to maintain traction in the yaw direction. Consequently, applying a yaw moment to attempt to rotate the foot and correct the slip may result in further slipping.

Therefore, in some cases the robot may respond to the yaw slip by adjusting the forward and/or lateral shear force components and reducing the yaw moment of the force allocation. For example, based on the forward or lateral distance from the foot to the robot's center of mass, the forward or lateral shear force on the foot may be used to indirectly yaw the robot and thereby correct the yaw slip. However, because the shear forces on the foot are also utilized to control other aspects of the robot's gait, such as the forward/lateral velocity, and pitch/roll, controlling yaw with the shear forces may result in a tradeoff of the control of one or more of these other aspects. Consequently, the robot may prioritize which components are the most critical to its gait, and may adjust the force allocation based on the prioritization.

In some cases, the robot's yaw may not be as important to the robot's gait as, for instance, its pitch or roll. Large pitch or roll errors, for example, may cause the robot to fall over, whereas a large change in yaw will generally only change the robot's heading. Additionally, correcting yaw errors as described above, by increasing the shear force components of the foot, may introduce additional forward or lateral velocity errors, as well as pitch and roll errors. The same may also be true when correcting yaw errors via a directly applied yaw moment to the foot. Therefore, when correcting a yaw error, the robot may determine that other aspects are relatively more important to the robot's gait, and may deprioritize yaw when it determines a force allocation for the foot.

Consequently, the robot may adjust its gait to incorporate some yaw errors, rather than correcting them. For example, the robot may initially determine a requested yaw. The requested yaw may be based on an external input to the robot, or based on the robot's own determination to avoid obstacles, for instance. The robot may then detect that a yaw rotation (e.g., a yaw slip) has occurred, and based on the detected rotation, determine a measured yaw for the robot. If the difference between the requested yaw and the measured yaw is relatively small, the robot may attempt to correct the yaw rotation. However, if the difference between the requested yaw and the measured yaw is greater than a threshold difference, the robot may attempt to correct only the portion of the yaw error.

For example, the robot may determine a target yaw that is between the measured yaw and the requested yaw, and then cause the foot to rotate the robot to the target yaw. The target yaw may be, for instance, equal to the threshold difference from the requested yaw. The robot may determine the measured yaw periodically, and may update the measured yaw based on multiple slips and other yaw rotations of the robot. The robot may then update the target yaw accordingly, such that the robot's yaw error, and thus the required yaw correction, is always less than or equal to the threshold difference.

II. EXAMPLE ROBOTIC SYSTEMS

Referring now to the figures, FIG. 1 illustrates an example configuration of a robotic system. The robotic system 100 represents an example robotic system configured to perform the implementations described herein. Additionally, the robotic system 100 may be configured to operate autonomously, semi-autonomously, and/or using directions provided by user(s), and may exist in various forms, such as a biped robot or a quadruped robot, among other examples. Furthermore, the robotic system 100 may also be referred to as a robotic device, mobile robot, or robot, among others.

As shown in FIG. 1, the robotic system 100 may include processor(s) 102, data storage 104, program instructions 106, and controller(s) 108, which together may be part of a control system 118. The robotic system 100 may also include sensor(s) 112, power source(s) 114, mechanical components 110, and electrical components 116. Note that the robotic system 100 is shown for illustration purposes as robotic system 100 and may include more or less components within various examples. The components of robotic system 100 may be connected in any manner, including wired or wireless connections, etc. Further, in some examples, components of the robotic system 100 may be positioned on multiple entities rather than a single entity. Other example illustrations of robotic system 100 may exist.

Processor(s) 102 may operate as one or more general-purpose processors or special purpose processors (e.g., digital signal processors, application specific integrated circuits, etc.). The processor(s) 102 may be configured to execute computer-readable program instructions 106 that are stored in the data storage 104 and are executable to provide the operations of the robotic system 100 described herein. For instance, the program instructions 106 may be executable to provide functionality of controller(s) 108, where the controller(s) 108 may be configured to cause activation and deactivation of the mechanical components 110 and the electrical components 116.

The data storage 104 may exist as various types of storage configured to hold memory. For example, the data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices, which may communicate via wired or wireless communication. Further, in addition to the computer-readable program instructions 106, the data storage 104 may include additional data such as diagnostic data, among other possibilities.

The robotic system 100 may include at least one controller 108, which may interface with the robotic system 100. The controller 108 may serve as a link between portions of the robotic system 100, such as a link between mechanical components 110 and/or electrical components 116. In some instances, the controller 108 may serve as an interface between the robotic system 100 and another computing device. Further, the controller 108 may serve as an interface between the robotic system 100 and a user(s). The controller 108 may include various components for communicating with the robotic system 100, including a joystick(s), buttons, among others. The example interfaces and communications noted above may be implemented via a wired or wireless connection, or both. The controller 108 may perform other functions for the robotic system 100 as well. Other examples of controllers may exist.

Mechanical components 110 represent possible hardware of the robotic system 100 that may enable the robotic system 100 to operate and perform physical operations. As a few examples, the robotic system 100 may include actuator(s), extendable leg(s) ("legs"), arm(s), wheel(s), one or more structured bodies for housing the computing system or other components, and other mechanical components. The mechanical components 110 may depend on the design of the robotic system 100 and may also be based on the functions and/or tasks the robotic system 100 may be configured to perform. As such, depending on the operation and functions of the robotic system 100, different mechanical components 110 may be available for the robotic system 100 to utilize. In some examples, the robotic system 100 may be configured to add and/or remove mechanical components 110, which may involve assistance from a user and/or other robot. For example, the robotic system 100 may be initially configured with four legs, but may be altered by a user or the robotic system 100 to remove two of the four legs to operate as a biped. Other examples of mechanical components 110 may be included within some implementations.

Additionally, the robotic system 100 may include one or more sensor(s) 112 arranged to sense aspects of the robotic system 100. The sensor(s) 112 may include one or more force sensors arranged to measure load on various components of the robotic system 100. In an example, the sensor(s) 112 may include one or more force sensors on each leg. Such force sensors on the legs may measure the load on the actuators that move one or more members of the legs.

The sensor(s) 112 may further include one or more position sensors. Position sensors may sense the position of the actuators of the robotic system. In one implementation, position sensors may sense the extension, retraction, or rotation of the actuators on the legs of the robot. The sensor(s) 112 may further include one or more velocity and/or acceleration sensors. For instance, the sensor(s) 112 may include an inertial measurement unit (IMU). The IMU may sense velocity and acceleration in the world frame, with respect to the gravity vector. The velocity and acceleration of the IMU may then be translated to the robotic system, based on the location of the IMU in the robotic system and the kinematics of the robotic system. Other sensor(s) 112 are also possible, including proximity sensors, motion sensors, load sensors, touch sensors, depth sensors, ultrasonic range sensors, and infrared sensors, among other possibilities.

The sensor(s) 112 may provide sensor data to the processor(s) 102 to allow for appropriate interaction of the robotic system 100 with the environment as well as monitoring of operation of the systems of the robotic system 100. The sensor data may be used in evaluation of various factors for activation and deactivation of mechanical components 110 and electrical components 116 by controller 108 and/or a computing system of the robotic system 100.

The sensor(s) 112 may provide information indicative of the environment of the robot for the controller 108 and/or computing system to use to determine operations for the robotic system 100. For example, the sensor(s) 112 may capture data corresponding to the terrain of the environment or location of nearby objects, which may assist with environment recognition and navigation, etc. In an example configuration, the robotic system 100 may include a sensor system that includes RADAR, LIDAR, SONAR, VICON®, one or more cameras, a global positioning system (GPS) transceiver, and/or other sensors for capturing information of the environment of the robotic system 100. The sensor(s) 112 may monitor the environment in real-time and detect obstacles, elements of the terrain, weather conditions, temperature, and/or other parameters of the environment for the robotic system 100.

Further, the robotic system 100 may include other sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The sensor data provided by the sensors may enable the computing system of the robotic system 100 to determine errors in operation as well as monitor overall functioning of components of the robotic system 100. For example, the computing system may use sensor data to determine a stability of the robotic system 100 during operations as well as measurements related to power levels, communication activities, components that require repair, among other information. As an example configuration, the robotic system 100 may include gyroscope(s), accelerometer(s), and/or other possible sensors to provide sensor data relating to the state of operation of the robot. Further, sensor(s) 112 may also monitor the current state of a function, such as a gait, that the robotic system 100 may currently be operating. Other example uses for the sensor(s) 112 may exist as well.

Additionally, the robotic system 100 may also include one or more power source(s) 114 configured to supply power to various components of the robotic system 100. Among possible power systems, the robotic system 100 may include a hydraulic system, electrical system, batteries, and/or other types of power systems. As an example illustration, the robotic system 100 may include one or more batteries configured to provide charge to components that may receive charge via a wired and/or wireless connection. Within examples, components of the mechanical components 110 and electrical components 116 may each connect to a different power source or may be powered by the same power source. Components of the robotic system 100 may connect to multiple power sources 114 as well.

Within example configurations, any type of power source may be used to power the robotic system 100, such as a gasoline engine. Further, the power source(s) 114 may charge using various types of charging, such as wired connections to an outside power source, wireless charging, combustion, or other examples. Additionally, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system of the robotic system 100 may transfer a large amount of power through small tubes, flexible hoses, or other links between components of the robotic system 100. Other power sources may be included within the robotic system 100 within examples.

The electrical components 116 may include various components capable of processing, transferring, providing electrical charge or electric signals, for example. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various functions. The electrical components 116 may be configured to provide power from the power source(s) 114 to the various mechanical components 110, for example. Further, the robotic system 100 may include electric motors. Other examples of electrical components 116 may exist as well.

Figure 2:
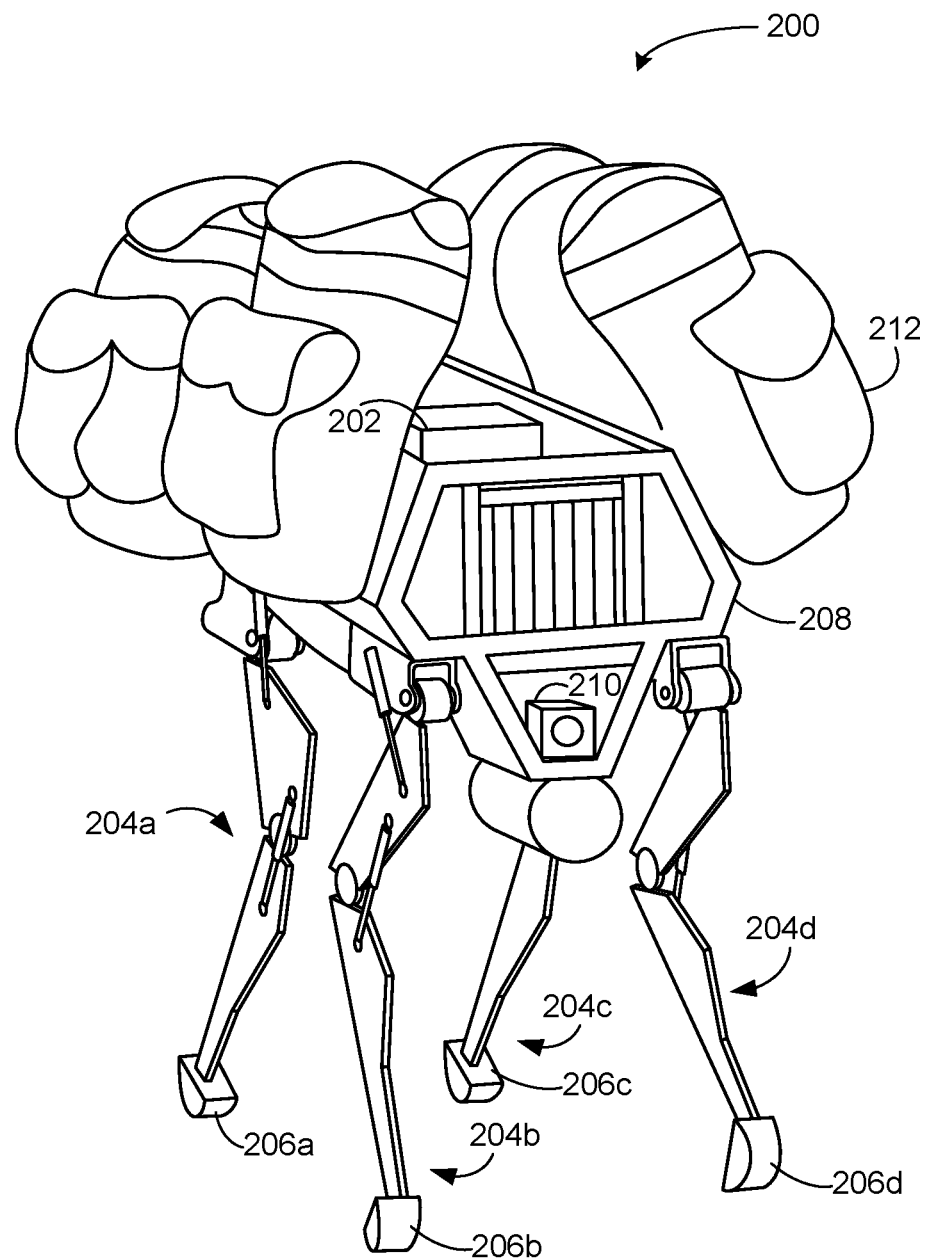
FIG. 2 illustrates a quadruped robot, according to an example implementation.

FIG. 2 illustrates an example quadruped robot 200, according to an example implementation. Among other possible functions, the robot 200 may be configured to perform some of the methods described herein during operation. The robot 200 includes a control system 202, and legs 204a, 204b, 204c, 204d connected to a body 208. Each leg may include a respective foot 206a, 206b, 206c, 206d that may contact the ground surface. The robot 200 may also include sensors (e.g., sensor 210) configured to provide sensor data to the control system 202 of the robot 200. Further, the robot 200 is illustrated carrying a load 212 on the body 208. Within other example implementations, the robot 200 may include more or less components and may additionally include components not shown in FIG. 2.

The robot 200 may be a physical representation of the robotic system 100 shown in FIG. 1 or may be based on other configurations. To operate, the robot 200 includes a computing system that may be made up of one or more computing devices configured to assist in various operations of the robot 200, which may include processing data and providing outputs based on the data. The computing system may process information provided by various systems of the robot 200 (e.g., a sensor system) or from other sources (e.g., a user, another robot, a server) and may provide instructions to the systems to operate in response.

Additionally, the computing system may monitor systems of the robot 200 during operation, to determine errors and/or monitor regular operation, for example. In some example configurations, the computing system may serve as a connection between the various systems of the robot 200 that coordinates the operations of the systems together to enable the robot 200 to perform functions. Further, although the operations described herein correspond to a computing system of a robot performing tasks, the computing system may be made of multiple devices, processors, controllers, and/or other entities configured to assist in the operation of the robot. Additionally, the computing system may operate using various types of memory and/or other components.

Although the robot 200 includes four legs 204a-204d in the illustration shown in FIG. 2, the robot 200 may include more or less legs within other examples. Further, the configuration, position, and/or structure of the legs 204a-204d may vary in example implementations. The legs 204a-204d enable the robot 200 to move and may be configured to operate in multiple degrees of freedom to enable different techniques of travel to be performed. In particular, the legs 204a-204d may enable the robot 200 to travel at various speeds through mechanically controlling the legs 204a-204d according to the mechanics set forth within different gaits. A gait is a pattern of movement of the limbs of an animal, robot, or other mechanical structure. As such, the robot 200 may navigate by operating the legs 204a-204d to perform various gaits. The robot 200 may use one or more gaits to travel within an environment, which may involve selecting a gait based on speed, terrain, the need to maneuver, and/or energy efficiency.

Further, different types of robots may use different gaits due to differences in design that may prevent use of certain gaits. Although some gaits may have specific names (e.g., walk, trot, run, bound, gallop, etc.), the distinctions between gaits may overlap. The gaits may be classified based on footfall patterns—the locations on the ground surface for the placement the feet 206a-206d. Similarly, gaits may also be classified based on mechanics.

One or more systems of the robot 200, such as the control system 118, may be configured to operate the legs 204a-204d to cause the robotic 200 to move. Additionally, the robot 200 may include other mechanical components, which may be attached to the robot 200 at various positions. The robot 200 may include mechanical arms, grippers, or other features. In some examples, the legs 204a-204d may have other types of mechanical features that enable control upon various types of surfaces that the robot may encounter, such as wheels, etc. Other possibilities also exist.

As part of the design of the example robot 200, the body 208 of the robot 200 connects to the legs 204a-204d and may house various components of the robot 200. As such, the structure of the body 208 may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body 208 as well as the legs 204 may be developed using various types of materials, such as various metals or plastics. Within other examples, a robot may have a body with a different structure or made of other types of materials.

The sensor(s) 210 of the robot 200 may include various types of sensors, such as the camera or sensing system shown in FIG. 2. The sensor(s) 210 is positioned on the front of the body 208, but may be placed at other positions of the robot as well. As described for the robotic system 100, the robot 200 may include a sensory system that includes force sensors, position sensors, IMUs, RADAR, LIDAR, SONAR, VICON®, GPS, accelerometer(s), gyroscope(s), and/or other types of sensors. The sensor(s) 210 may be configured to measure parameters of the environment of the robot 200 as well as monitor internal operations of systems of the robot 200. As an example illustration, the robot 200 may include sensors that monitor the accuracy of its systems to enable the computing system to detect a system within the robot 100 that may be operating incorrectly. Other uses of the sensor(s) 210 may be included within examples.

The load 212 carried by the robot 200 may represent various types of cargo that the robot 200 may transport. The load 212 may also represent external batteries or other types of power sources (e.g., solar panels) that the robot 200 may utilize. The load 212 represents one example use for which the robot 200 may be configured. The robot 200 may be configured to perform other operations as well.

Additionally, as shown with the robotic system 100, the robot 200 may also include various electrical components that may enable operation and communication between the mechanical features of the robot 200. Also, the robot 200 may include one or more computing systems that include one or more processors configured to perform various operations, including processing inputs to provide control over the operation of the robot 200. The computing system may include additional components, such as various types of storage and a power source, etc.

During operation, the computing system may communicate with other systems of the robot 200 via wired or wireless connections and may further be configured to communicate with one or more users of the robot. As one possible illustration, the computing system may receive an input from a user indicating that the user wants the robot to perform a particular gait in a given direction. The computing system may process the input and may perform an operation that may cause the systems of the robot to perform the requested gait. Additionally, the robot's electrical components may include interfaces, wires, busses, and/or other communication links configured to enable systems of the robot to communicate.

Furthermore, the robot 200 may communicate with one or more users and/or other robots via various types of interfaces. In an example implementation, the robot 200 may receive input from a user via a joystick or similar type of interface. The computing system may be configured to measure the amount of force and other possible information from inputs received from a joystick interface. Similarly, the robot 200 may receive inputs and communicate with a user via other types of interfaces, such as a mobile device or a microphone. The computing system of the robot 200 may be configured to process various types of inputs.

Figure 3:
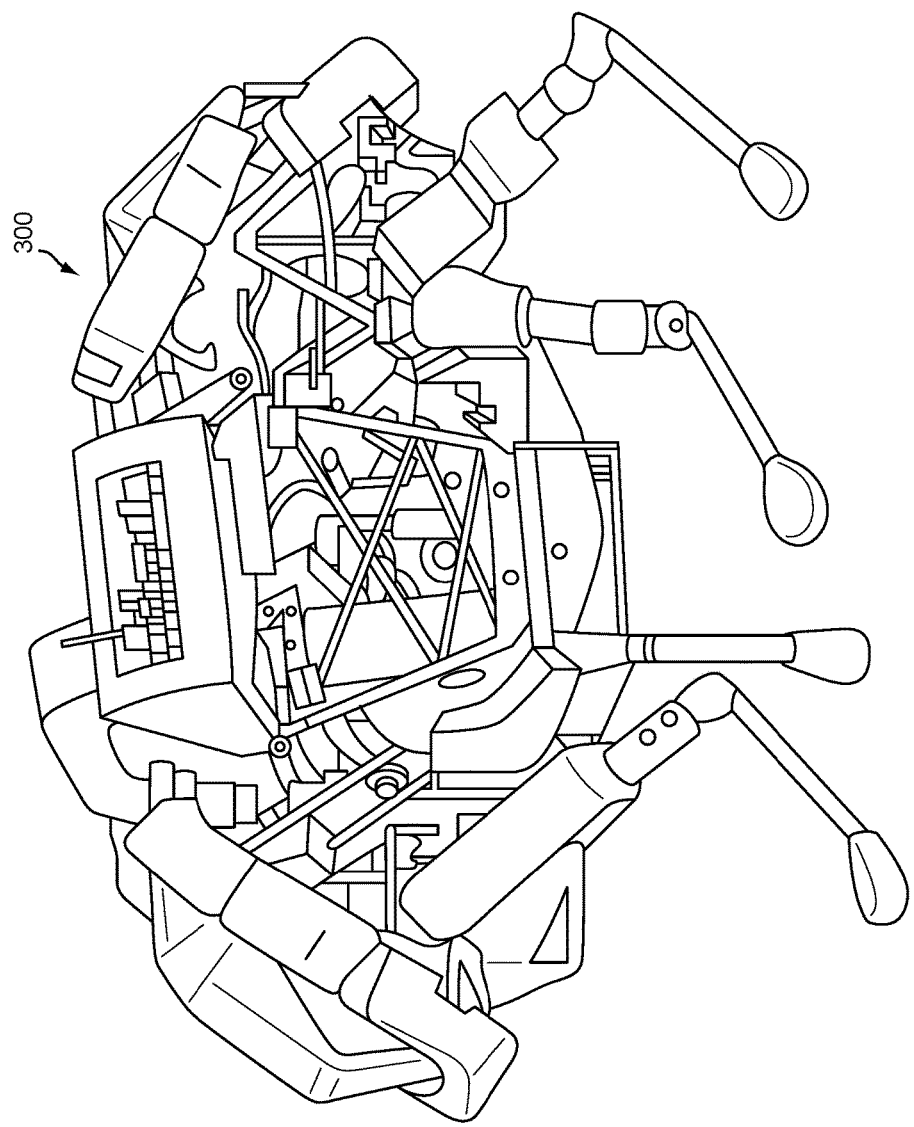
FIG. 3 illustrates another quadruped robot, according to an example implementation.

FIG. 3 illustrates another quadruped robot 300 according to an example implementation. Similar to robot 200 shown in FIG. 2, the robot 300 may correspond to the robotic system 100 shown in FIG. 1. The robot 300 serves as another possible example of a robot that may be configured to perform some of the implementations described herein.

Figure 4:
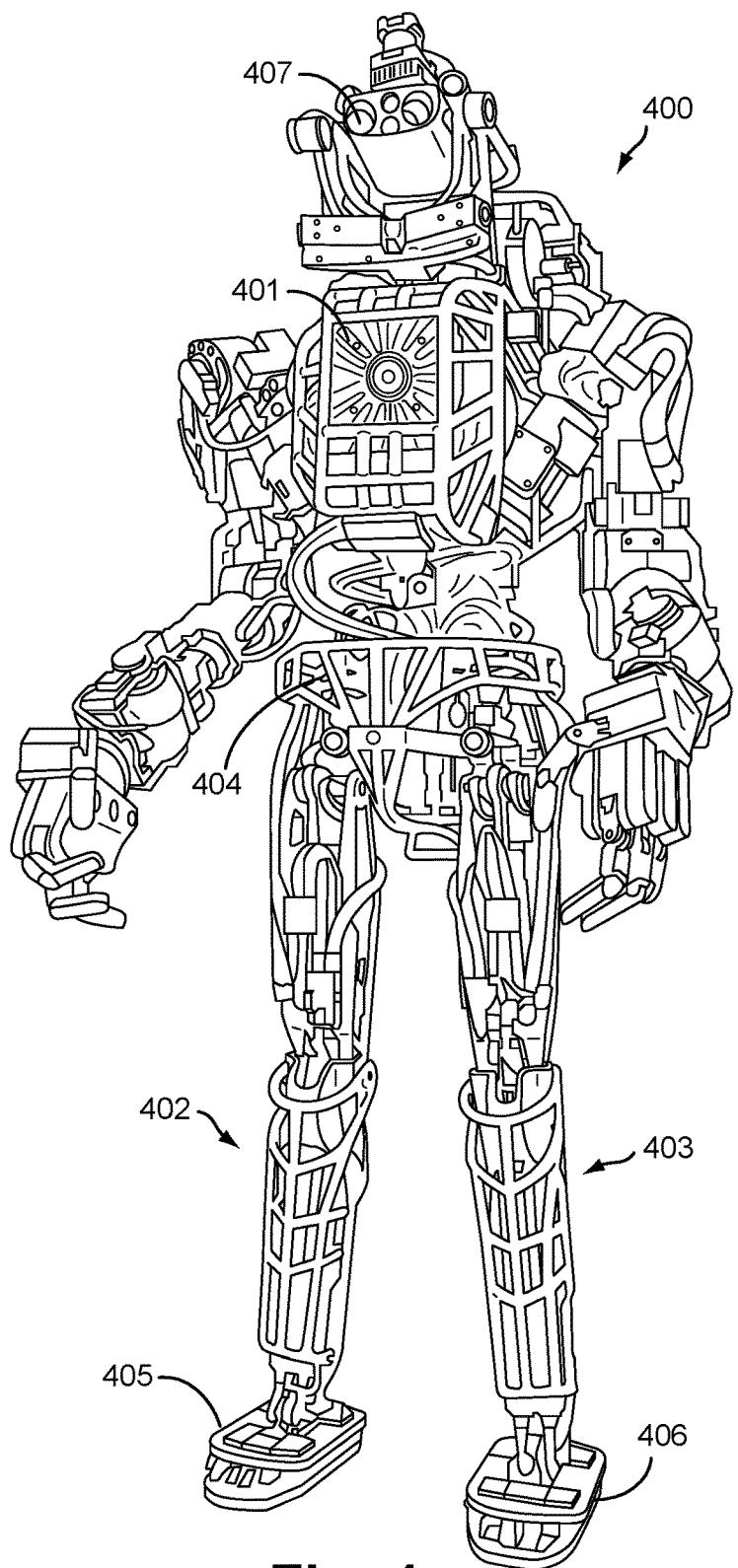
FIG. 4 illustrates a biped robot, according to an example implementation.

FIG. 4 illustrates a biped robot 400 according to another example implementation. Similar to robots 200 and 300 shown in FIGS. 2 and 3, the robot 400 may correspond to the robotic system 100 shown in FIG. 1, and may be configured to perform some of the implementations described herein. The robot 400 may include more or less components than those shown in FIG. 2 and discussed with respect to the robot 200. For example, the robot 400 may include a control system 401 and legs 402, 403 connected to a body 404. Each leg may include a respective foot 405, 406, that may contact the ground surface. The robot 400 may also include sensors (e.g., sensor 407) configured to provide sensor data to the control system 401 of the robot 400.

III. EXAMPLE IMPLEMENTATIONS FOR YAW SLIP HANDLING IN A BIPED ROBOT

Example implementations are discussed below for handling yaw slips in an example biped robot. The handling of yaw slips may include updating a force allocation for a foot of the biped robot based on a determined yaw rotation of the biped robot's body. The yaw slip handling may additionally or alternatively include moderating the biped robot's reaction to yaw slips by determining a target yaw for the body of the biped robot.

Further, the term ground surface as used herein is meant to encompass any possible surface or terrain that the robot may encounter, and is not meant to be limiting. For instance, the ground surface may be indoors or outdoors, may be rigid or loose, such as sand or gravel, and may include discontinuities or irregularities such as stairs, rocks, fallen trees, debris, and the like. Numerous other examples exist.

Figure 5:
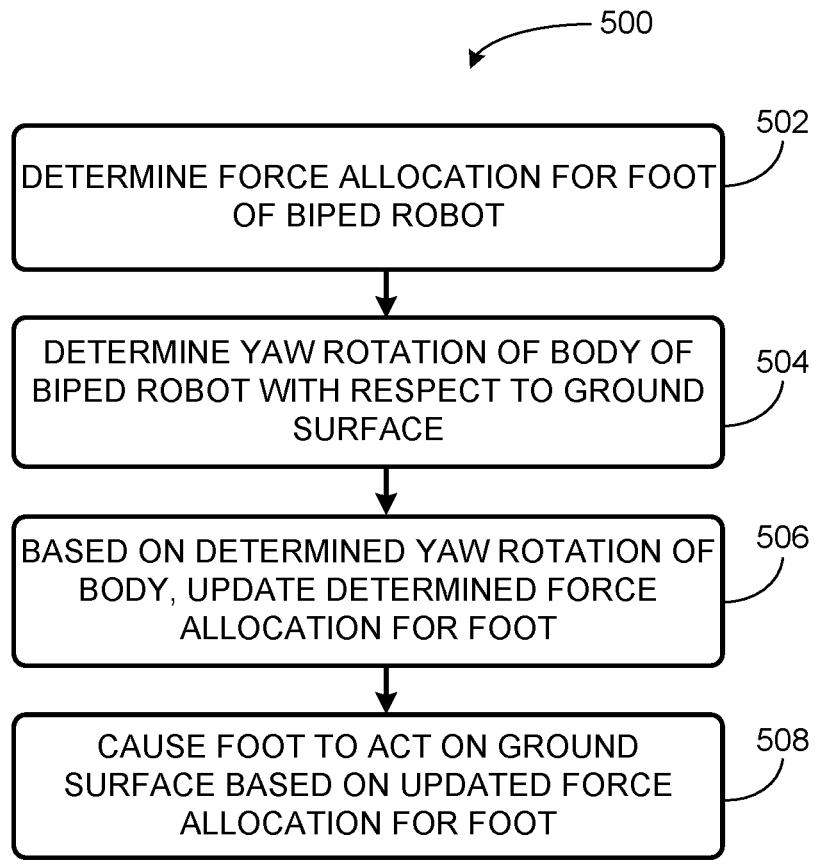
FIG. 5 is a flowchart according to an example implementation.
Figure 7:
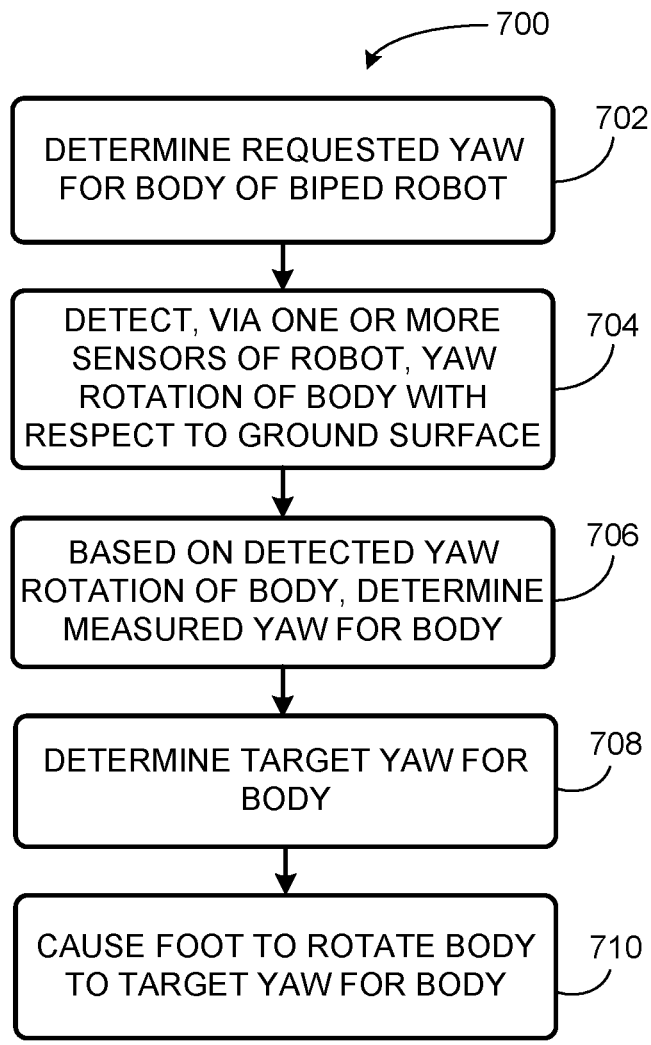
FIG. 7 is a flowchart according to an example implementation.

Flow charts 500 and 700 shown in FIGS. 5 and 7 respectively, present example operations that may be implemented by a biped robot, such as the example robot 400 shown in FIG. 4. Flow charts 500 and 700 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, the flow charts 500 and 700 and other operations disclosed herein provide the operation of possible implementations. In this regard, each block may represent a module, a segment, or a portion of program code, which includes one or more instructions executable by a processor for implementing specific logical operations. The program code may be stored on any type of computer readable medium, for example, such as a storage device including a disk or hard drive. In addition, each block may represent circuitry that is wired to perform the specific logical operations.

A. Example Implementations for Adjusting a Force Allocation for a Foot

FIG. 5 is a flowchart 500 illustrating operations for adjusting a force allocation of a biped robot's foot based on a determined yaw rotation of the biped robot's body. The following paragraphs discuss a biped robot with two feet, however the operations may also be applicable to robots with a different number of feet, such as a quadruped robot with four feet, among other examples. Further, the operations discussed below may be performed by a robot that is walking, trotting, or running. Other gaits are also possible.

Figure 6A:
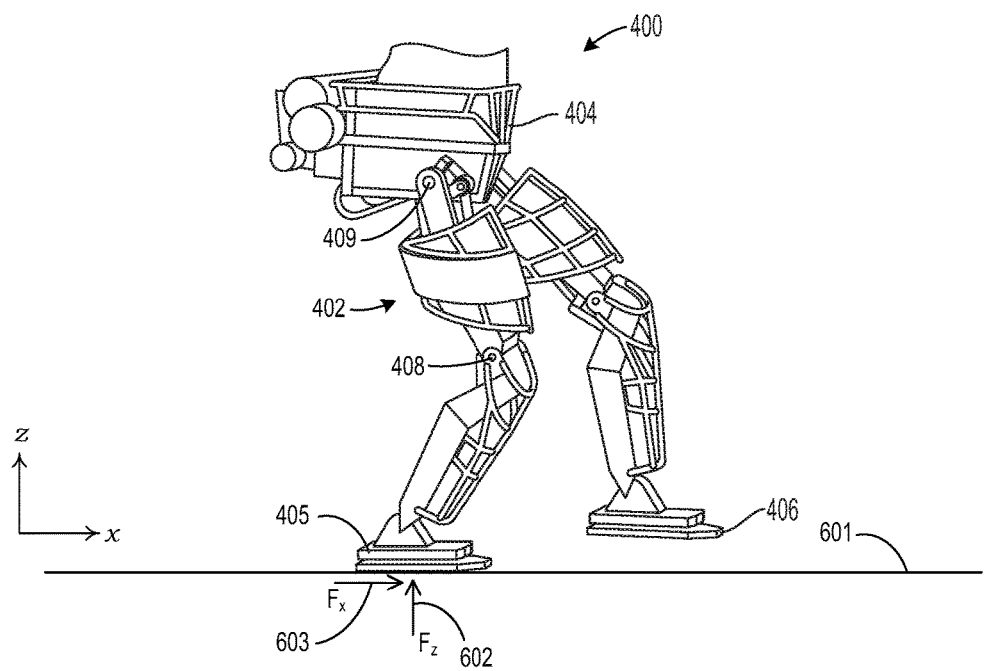
FIG. 6A illustrates a foot of a robot in contact with a ground surface, according to an example implementation.
Figure 6B:
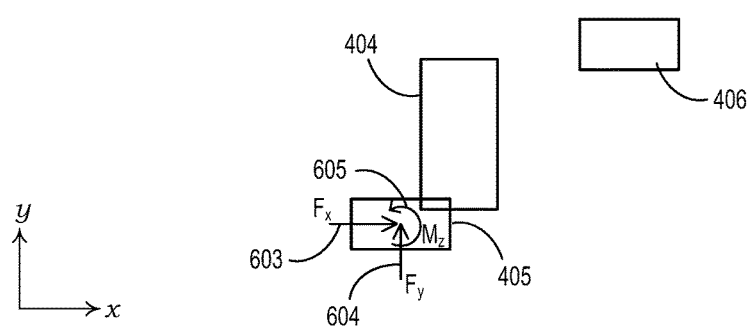
FIG. 6B illustrates the foot of the robot in contact with a ground surface, according to an example implementation.
Figure 6C:
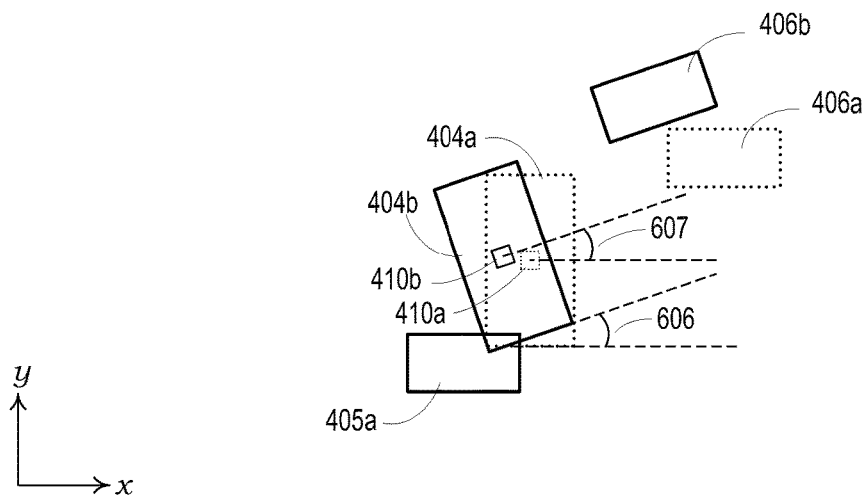
FIG. 6C illustrates the foot of the robot in contact with a ground surface, according to an example implementation.
Figure 6D:
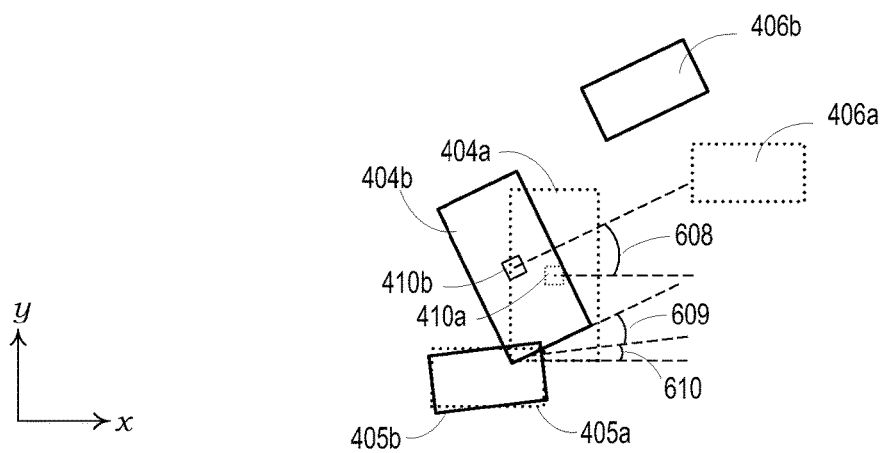
FIG. 6D illustrates the foot of the robot in contact with a ground surface, according to an example implementation.

At block 502, a biped robot may determine a force allocation for a foot of the biped robot. The biped robot may be, for instance, the robot 400 shown in FIG. 4, and may include a body 404 coupled to the foot 405 via a leg 402. FIG. 6A illustrates a side view and FIGS. 6B-6D illustrate a top view of the example robot 400 in a walking gait. The robot's right foot 405 is in contact with a ground surface 601, in a "stance" state, while the left foot 406 is in a "swing" state, not contacting the ground surface 601. For clarity, the top view in FIGS. 6B-6D shows only the feet 405, 406 and the body 404 as a simplified block diagram. Other gaits and other relative positions for the feet of the robot 400 are also possible.

The robot 400 may include six degrees of freedom, or possible directions of movement, including forward (x-axis), lateral (y-axis), and vertical (z-axis) translations, as well as roll (x-axis), pitch (y-axis), and yaw (z-axis) rotations. The robot 400 may control movements in each of these six directions by determining how to allocate the ground reaction force that acts upon the foot 405 among several component forces.

For example, referring to FIGS. 6A and 6B, the determined force allocation for the foot may include a vertical force component 602 ($F_z$, applied along the z-axis), a forward shear force component 603 ($F_x$, applied along the x-axis), a lateral shear force component 604 ($F_y$, applied along the y-axis), and a yaw moment component 605 ($M_z$, applied about the z-axis). The determination of how to allocate the ground reaction force among these component forces, including what magnitudes to assign each component force, may be based on the current needs of the robot 400 to, for instance, support the robot's weight, correct any detected gait errors (e.g., slips, collisions, etc.), and to generally maintain the robot's posture and balance.

In some cases, the robot 400 may determine a relative control priority for each of the six degrees of freedom and then base the determination of the force allocation for the foot on the relative control priorities. For example, if the robot 400 detects a pitch error, such as the robot 400 leaning too far forward, the robot 400 may prioritize pitch control over the control of the robot's other degrees of freedom, in order to prevent the robot 400 from falling over.

The prioritization of certain degrees of freedom over others does not mean that control objectives related to a higher priority, such as pitch control, must be exactly satisfied. The robot 400 might not, for example, determine a force allocation for the foot 405 that provides the exact change in rotational velocity that is necessary to correct a given pitch error. Rather, the prioritization of the robot's degrees of freedom may result in a weighted objective scheme. Under a weighted scheme, the robot 400 may determine a force allocation for the foot such that some control objectives are closer to being satisfied than others, but where none of the robot's control objectives are exactly satisfied.

For instance, the robot 400 may prioritize pitch control over forward velocity control. Based on this prioritization, the robot 400 may determine a force allocation for the foot 405 that results in 75% of the change in rotational velocity required to correct the robot's pitch, but that only results in 20% of the change in forward velocity required to maintain the robot's current speed. Other examples are also possible, and may involve more control objectives and other degrees of freedom.

At block 504, the robot 400 may determine a yaw rotation of the body 404 with respect to the ground surface 601, which may represent a slip of the foot 405 that is in contact with the ground surface 601. The robot 400 may determine if a slip has occurred by detecting the yaw rotation of the body with two different sets of sensors and then comparing the two detected yaw rotations.

For example, FIG. 6C illustrates a top view of the foot 405a and the body 404a before a given yaw rotation (in dotted lines), and the foot 405b and body 404b after the given yaw rotation (in solid lines). The robot 400 may detect, by a first set of sensors, a first yaw rotation of the body 404 with respect to the foot 405. The first set of sensors may include position sensors in the leg 402 of the robot 400. The sensors may detect and relay position and velocity data to a control system, and possibly other systems, of the robot 400. For example, the first set of sensors may include one or more sensors 408 located in a knee joint of the leg 402 that detect the movements on the knee joint, and one or more sensors 409 located in a hip joint of the leg 402 that detect movements of the hip joint. Other sensors may be included in the first set of sensors, and the location of these sensors on the robot 400 may be varied.

The robot 400 may receive position and velocity data regarding the movement of the leg 402 and the foot 405 from the first set of sensors. Based on this data, the robot 400 may, through the application of forward kinematics equations, determine an estimated rotation 606 of the body 404a, 404b with respect to the foot 405a of the robot 400. Determining the rotation 606 in this manner may be referred to as kinematic odometry.

If it is assumed that the foot 405a remains in contact with the ground surface 601 and does not slip or otherwise move relative to the ground 601, then the first yaw rotation 606 of the body 404a, 404b with respect to the foot 405a may be approximately equal to the yaw rotation of the body 404a, 404b with respect to the ground surface 601. Thus, utilizing the assumption of a nonmoving, or relatively nonmoving stance foot 405a, the robot 400 may determine the yaw rotation of the body 404a, 404b in the world frame, with respect to the ground surface 601

Still referring to FIG. 6C, the robot 400 may also detect, by a second set of sensors, a second yaw rotation of the body 404 with respect to the ground surface 601. The second set of sensors may include one or more inertial measurement units (IMUs) that may detect the robot's velocity and acceleration in the world frame, where the z-axis is aligned with the gravity vector. For instance, an IMU 410a, 410b may be located within the body 404a, 404b of the robot 400, as shown in FIGS. 6C-6D. The IMU 410a, 410b may include a three-axis accelerometer and a three-axis gyroscope that may detect accelerations and velocities of the body 404a, 404b in three coordinate directions. Accordingly, the robot 400 may integrate the angular velocity detected by the gyroscope to determine the second yaw rotation 607 of the body 404a, 404b with respect to the ground surface 601, as shown in FIG. 6C.

Although the examples discussed herein and shown in the FIGS. 6C-6D relate to an IMU, other sensors may be used, alone or in combination, to detect the acceleration, velocity, and/or orientation of the robot 400 to detect the second yaw rotation of the body 404a, 404b. For instance, other sensors that may detect the second yaw rotation may include RADAR, LIDAR, SONAR, VICON®, two or more cameras enabling stereo vision, among other examples. Other sensors and other detections that are not based on the foot 405a of the robot 400 in contact with the ground surface 601 are also possible.

The robot 400 may compare a difference between the first detected yaw rotation 606 and the second detected yaw rotation 607 to a threshold difference. Unlike the first detected yaw rotation 606 discussed above, the second detected yaw rotation 607 of the body 404a, 404b of the robot 400 in the world frame is not based on the assumption that the foot 405a is in contact with and nonmoving with respect to the ground surface 601. Thus, if the two detected yaw rotations are the same or nearly the same, it may indicate that the assumption is true and the foot 405a has not moved with respect to the ground surface 601. Such an example is illustrated in FIG. 6C, which may correspond to the robot 400 applying a yaw moment to the foot 405a to steer the robot 400.

Conversely, a difference between the first and second detected yaw rotations that exceeds a pre-determined, non-zero threshold may indicate that the assumption underlying the first detected yaw rotation might not be true. The threshold may be within a range of, for example, 0.10 to 0.30 radians for the robot 400, and may indicate the rotation below which a slip of the robot's foot 405a may be too small to cause a significant error to the robot's gait. Other thresholds are also possible, and may vary depending on the size and shape of the robot, and for different gaits of the robot.

FIG. 6D illustrates another example top view of the robot 400 where the foot 405a, 405b has slipped in the yaw direction, in addition to steering the robot 400. Here, the second detected yaw rotation 608 based on the data from the IMU 410a, 410b may still approximate the "actual" yaw rotation of the body 404a, 404b in the world frame, with respect to the ground surface 601.

However, the first detected yaw rotation 609 based on kinematic odometry, as shown in FIG. 6D, might not approximate the yaw rotation by the body 404a, 404b with respect to the ground surface 601. In other words, it might not approximate the yaw rotation the body 404a, 404b in the world frame. For example, if the foot 405a, 405b slips counterclockwise in the yaw direction as shown in FIG. 6D, the first detected yaw rotation 609 may be less than the second yaw rotation 608 detected by the IMU. This is because the kinematic odometry of the foot 405a, 404b in relation to the body 404a, 404b does not account for the yaw slip, which is shown in FIG. 6D as the rotation 610 of the foot 405a, 405b with respect to the ground 601. Accordingly, at block 504, the robot 400 may determine the net yaw rotation 610 of the body 404a, 404b to be the difference between the first detected yaw rotation 609 and the second detected yaw rotation 608. The robot 400 may further determine that the net yaw rotation 610 is greater than the non-zero threshold difference, indicating that a yaw slip may have occurred.

At block 506, the robot 400 may, based on the determined yaw rotation 610 of the body 404, update the determined force allocation for the foot 405a. However, in some cases, the robot's potential reaction to a determined slip may further disrupt the gait of the robot 400, and therefore it may be desirable to tolerate small slips of the robot's foot 405a rather than initiate an immediate reaction. Therefore, in some examples, the robot 400 may update the determined force allocation for the foot 405a based on a determination that the yaw rotation of the body 404a, 404b is greater than the non-zero threshold rotation.

If the foot 405a of the robot 400 slips in the yaw direction, the slip may result in a change to the heading of the robot 400, and it may be desirable to correct the yaw rotation. However, if the robot's foot 405 is slipping in the yaw direction, it may indicate that there is not sufficient friction for the foot to maintain traction in the yaw direction, and applying a yaw moment to attempt to rotate the foot and correct the slip may result in further slipping. Thus, the slip may result in a reduced ability to yaw the foot 405.

Therefore, in some cases the robot 400 may update the determined force allocation for the foot by reducing the yaw moment component 605 shown in FIG. 6B. Additionally or alternatively, the robot 400 may increase one or both of the forward shear force component 603 and the lateral shear force component 604. Adjusting these shear forces may compensate for the loss in yaw control, as the shear forces may also yaw the robot 400 based on the forward or lateral distance from the foot 405 to the robot's center of mass.

However, because the forward and lateral shear forces 603, 604 on the foot 405 are also utilized to control other aspects of the robot's gait, such as the forward and/or lateral velocity, pitch, and/or roll, controlling yaw via the shear forces 603, 604 may result in a tradeoff of the control over these other degrees of freedom. For instance, correcting a yaw rotation by increasing the forward shear force component may sacrifice some control over the forward velocity and/or pitch rotation of the robot 400. Consequently, the updated force allocation for the foot 405 may account for the robot's reduced ability to control the yaw of the robot 400 independently from the forward and lateral shear forces 603, 604.

In some examples, the robot 400 may update the relative control priority for each of the robot's six degrees of freedom, and may base the updated force allocation on the updated relative control priorities. For instance, the robot 400 may determine that, although a yaw slip has occurred, there are no imminent obstacles to the robot's gait, and thus a yaw correction is not immediately necessary. Thus, the robot 400 may de-prioritize yaw control when determining the updated force allocation. In such an example, the robot 400 might not reduce its control over one or more of the other degrees of freedom in order to correct the yaw error. Other examples are also possible.

At block 508, the robot 400 may cause the foot 405 to act on the ground surface 601 based on the updated force allocation for the foot 405. For instance, by controlling the actuation and position of its leg 402, the robot 400 may control the forces exerted by the foot 405 on the ground surface 601, and thereby control the components of the ground reaction force that act upon the foot 405.

The robot 400 may determine the force allocation for the foot based on other data as well. For instance, the ground reaction force of the foot 405, and thus the component forces in the ground reaction force, may be limited based on the estimated friction available between the foot 405 and the ground surface. For example, the robot 400 may determine a representation for a coefficient of friction ($\mu$) between the foot 405 and the ground surface 601 that is within a range of 0.4 to 0.6, representing a coefficient of friction between the robot's foot 405 and many commonly encountered types of ground surfaces. For instance, the robot 400 may determine a representation of $\mu$ of 0.5.

Similarly, the robot 400 may determine a representation of a gradient of the ground surface 601. In some cases, the gradient of the ground surface may be approximated by a plane, which may include an angle of inclination in both the forward and lateral directions of the robot 400. The robot 400 may base its determination of the gradient on data received from sensors of the robot 400. For example, the detected ground reaction forces on one or more feet 405, 406 of the robot 400 may indicate that the ground surface 601 is not perpendicular to the gravity vector. Further, one or more IMUs of the robot 400 may determine that the height of the robot's body (i.e., the height of the IMU) has changed relative to the z-axis, indicating that the robot 400 may be moving along an inclined surface. Additionally or alternatively, the robot 400 may base the representation of the gradient on data received from a LIDAR, stereoscopic vision, or other spatial recognition system. Other examples are also possible.

Based on the determined representations of the coefficient of friction and the slope, the robot 400 may determine maximum relative values for the component forces 602, 603, 604 on the foot 405 during a step. The maximum relative values may represent the forces at which the foot 405 may exceed the estimated available friction force, possibly causing a slip. The maximum values for the component forces may be interdependent, for example, because the friction force on the foot 405 may be based on both the forward and lateral shear force components 603, 604. Further, the friction force on the foot 405 may increase or decrease based on the value of the vertical force component 602.

Collectively, the maximum relative values for the component forces may define a resultant friction threshold for the ground reaction force on the foot 405. The friction threshold may indicate an angle of incidence for the target ground reaction force at which the friction force reaches its maximum value, based on the determined μ. This may be referred to as the friction angle. In other words, a ground reaction force outside of the threshold orientation (i.e., exceeding the friction angle in any direction) would require a greater friction force component than is possible, and may result in a slip of the foot 405.

In some implementations, the robot 400 may determine a target ground reaction force and corresponding force allocation for the foot 405 based on the current needs of the robot 400 for balance, posture, navigation and the like. The robot 400 may then compare the determined target ground reaction force to the determined friction threshold. If the target ground reaction force exceeds the friction threshold, the robot 400 may truncate the target ground reaction force to be within the threshold.

Alternatively, the robot 400 may base the force allocation for the foot 405 on the maximum relative values for the component forces. This may allow the robot 400 to determine a target ground reaction force for the foot 405 that is initially within the friction threshold. Further, this may allow the robot 400 to optimize the force allocation for the foot based on the relative control priorities for each of the degrees of freedom of the robot 400.

B. Example Implementations for Moderating a Reaction to Yaw Slips

FIG. 7 is a flowchart 700 illustrating operations for moderating a biped robot's reactions to yaw slips. The following paragraphs discuss a biped robot with two feet, however the operations may also be applicable to robots with a different number of feet, such as a quadruped robot with four feet, among other examples. Further, the operations discussed below may be performed by a robot that is walking, trotting, or running. Other gaits are also possible.

At block 702, a biped robot may determine a requested yaw for a body of the biped robot. For example, the biped robot may be the robot 400 shown in FIG. 4, having a body 404 and a foot 405 coupled to the body 404 via a leg 402. Other biped robots having other configurations are also possible. The requested yaw for the body 404 represents a requested heading for the robot with respect to a given reference such as a compass direction, the robot's current heading, among other possibilities. The requested yaw may be determined in a number of ways. For instance, the requested yaw may be determined by the robot 400 based on its control system(s), which may include navigation and autonomy systems, among others. The requested yaw for the body 404 may also be determined based on a received input from an operator, a computing device, or perhaps another robot. Other examples are also possible.

At block 704, the robot 400 may detect, via one or more sensors, a yaw rotation of the body 404 with respect to the ground surface 601, as shown in FIGS. 6A-6D. The yaw rotation may represent a slip of the foot 405 that is in contact with the ground surface 601, or collision of the body 404 with an obstacle, among other examples. In some examples, the robot 400 may determine if a slip has occurred by detecting the yaw rotation of the body with two different sets of sensors and then comparing the two detected yaw rotations, as discussed above.

At block 706, the robot 400 may, based on the detected yaw rotation of the body 404, determine a measured yaw for the body 404. The measured yaw may approximate the "actual" yaw of the robot 400 at a given time and represent the current heading of the robot 400, which may differ from the requested yaw. Further, the measured yaw may incorporate multiple yaw rotations, based on disturbances as well as yaw corrections by the robot 400, over a period of time. Thus, in some cases the measured yaw may be determined to be approximately equal to the requested yaw. The robot 400 may determine the measured yaw based on a combination of kinematic odometry, IMU sensor data, or other sensor data that may provide information regarding the yaw of the robot 400. Further, the robot 400 may determine the measured yaw of the body 404 at a frequency within the range of 1-1000 Hz, for example.

In some examples, the yaw of the robot 400 may not be as important to the robot's gait as, for instance, its pitch or roll. Large pitch or roll errors, for example, may cause the robot 400 to fall over, whereas a large change in yaw will generally only change the robot's heading. Additionally, correcting yaw errors as described above, by increasing the shear force components of the foot 405, may introduce additional forward or lateral velocity errors, as well as pitch and roll errors. The same may be true when correcting yaw errors via an applied yaw moment to the foot 405 or the foot 406 in subsequent steps.

Therefore, in some implementations, the robot 400 may assign a relatively low priority for the correction of yaw errors. Although the robot 400 may attempt to correct some yaw errors by causing the foot 405 to rotate the body 404 of the robot 400 to the requested yaw, some yaw correction objectives might not be fully satisfied immediately following a yaw disturbance, in favor of other control priorities.

In some cases, yaw errors may accumulate based on multiple yaw rotations, until the cumulative yaw error becomes relatively large. For example, yaw errors may accumulate until the measured yaw reaches a non-zero threshold difference from the requested yaw. Additionally or alternatively, the robot 400 might experience a yaw disturbance, such as a slip or a collision, that causes a relatively large yaw error in a single event. In either case, when the yaw error reaches the non-zero threshold difference from the requested yaw, the yaw error may be referred to as fully saturated.

The threshold may be within a range of, for example, 0.15 to 0.50 radians for the robot 400, and may represent the point at which the yaw error becomes large enough that an attempted yaw correction would be too disruptive to the other components of the robot's gait. For instance, the threshold may be 0.30 radians. Other thresholds are also possible, and may vary depending on the size and shape of the robot, and for different gaits of the robot. If the robot's yaw error reaches the threshold, i.e., becomes fully saturated, the robot 400 may respond accordingly.

At block 708, the robot 400 may determine a target yaw for the body 404 that is between the measured yaw for the body 404 and the requested yaw for the body 404. For example, the target yaw for the body 404 may be determined to be the threshold difference of 0.30 radians from the measured yaw for the body 404. In some cases, determining the target yaw may include determining that the difference between the measured yaw and the requested yaw is greater than the non-zero threshold difference, as noted above.

After determining the target yaw for the body 404, the robot 400 may base yaw corrections on the target yaw, rather than the requested yaw. In doing so, the robot 400 may reduce its total yaw error to a smaller yaw rotation that remains at the threshold value of 0.30 radians or below. Accordingly, this may reduce the extent of the robot's yaw corrections, which can be disruptive to the robot's gait, as noted above.

Further, the robot 400 may determine and update the target yaw at a given frequency. The frequency may be within the range of 1-1000 Hz, for example. In some instances, the robot 400 may determine and update the target yaw at the same frequency that it determines the measured yaw 802.

At block 710, the robot 400 may cause the foot 405 to rotate the body 404 to the target yaw for the body 404. In some cases, if the robot's foot 405 is slipping in the yaw direction, the robot 400 may wait until control has been regained over the yaw moment component 605 of the foot 405 before the robot 400 causes the foot 405 to rotate the body 404 to the target yaw. In other examples, the robot 400 may update the determined force allocation for the foot 405 and cause the foot 405 the act on the ground surface 601 based on the updated force allocation, as discussed above with respect to flowchart 500.

Figure 8:
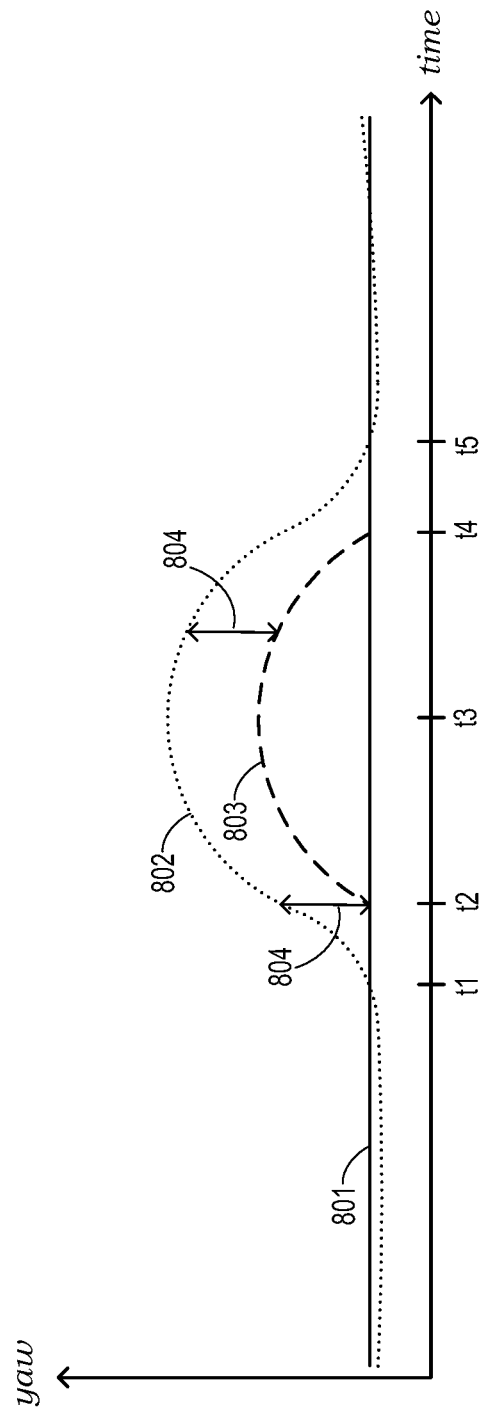
FIG. 8 illustrates a graph showing yaw values for a robot versus time, according to an example implementation.

FIG. 8 shows an example graph 800 of the requested, measured, and target yaws of the body 404 of the robot 400 over a period of time. The graph 800 may correspond to the robot 400 walking, for example, among other possible gaits. The requested yaw 801 of the body 404 is shown as a solid line at a constant yaw value on the graph 800. The requested yaw 801 in FIG. 8 may represent a given bearing relative to the robot's starting position, for instance. Other examples, including a requested yaw 801 that changes over time, are also possible. In FIG. 8, yaw may be expressed in degrees, radians, or other measures that may effectively convey the yaw of the robot 400.

The measured yaw 802 of the body 404 is shown as a dotted line in FIG. 8. At the left side of the graph 800, before time t1, the measured yaw 802 generally tracks the requested yaw 801, as the robot 400 may be walking in a relatively straight line, with little or no disturbances to its gait. However, at approximately time t1, the measured yaw 802 begins to deviate from the requested yaw 801. This may correspond to the robot 400 experiencing yaw slipping.

Moving to the right from time t1 on the graph 800, the robot 400 may detect further yaw rotation of the robot, and may update the measured yaw 802. Here, the measured yaw 802 continues to diverge from the requested yaw 801. This may correspond to a single yaw slip that is continuing to affect the robot 400, or an accumulation of yaw slips that occur on multiple steps of the robot 400. As noted above, the robot 400 may determine a relatively low-priority yaw correction, and the correction may be delayed in some cases in favor of higher-priority needs of the robot 400. For this reason, the yaw error may accumulate, and the difference between the measured yaw 802 and the requested yaw 801 may continue to grow.

At time t2, the difference between the measured yaw 802 and the requested yaw 801 may reach the non-zero threshold difference noted above, shown in FIG. 8 as the difference 804. The robot 400 may then determine a target yaw 803 for the body 404, shown on the graph 800 as a dashed line. The robot 400 may now "aim" for the target yaw 803, rather than the requested yaw 801, thereby requiring a smaller yaw correction. Nonetheless, the relative priority for correcting the yaw error may remain relatively low as compared to the other degrees of freedom of the robot 400.

Moving to the right of time t2, as the measured yaw 802 continues to diverge from the requested yaw 801, the target yaw 803 is continuously updated to track the measured yaw 802, and remains the difference 804 away from the measured yaw 802. In this way, the robot 400 may continue to limit the extent of any yaw error corrections. Although the total yaw error from the requested yaw 801 continues to grow, the robot's yaw corrections are now based on the target yaw 803 rather than the requested yaw 801, thus a yaw correction will never be larger than the difference 804.

As the robot 400 applies one or more yaw corrections to its gait by causing the foot 405 to rotate the body 404 of the robot 400 to the target yaw 803, the robot 400 may detect these additional yaw rotations of the body 404 and may update the measured yaw 802 for the body 404. At time t3 on the graph 800, the measured yaw 802 begins to converge back toward the requested yaw 801. The target yaw 803 is updated accordingly, and will also move back toward the requested yaw 801.

At time t4, based on the determined yaw rotations of the robot 400, the target yaw 803 may intersect the requested yaw 801. At this point, and moving to the right of time t4, the robot 400 may determine that the difference between the measured yaw 802 for the body 404 and the requested yaw 801 for the body 404 is less than the non-zero threshold difference. Thus, the robot 400 might stop determining the target yaw 803. The robot 400 may once again "aim" for the requested yaw 801, and may cause the foot 405 to rotate the body 404 to the requested yaw 801 for the body 404.

IV. CONCLUSION

While various implementations and aspects have been disclosed herein, other aspects and implementations will be apparent to those skilled in the art. The various implementations and aspects disclosed herein are for purposes of illustration and are not intended to be limiting, with the true scope and spirit being indicated by the following claims.

We claim:

1. A method comprising:
   determining, by a processor of a robot, a yaw axis slip of a foot of the robot with respect to a surface in contact with the foot, the robot comprising:
      a body; and
      a leg coupling the foot to the body;
   determining, by the processor, a requested yaw for the body of the robot;
   based on the determined yaw axis slip of the foot and the requested yaw for the body of the robot, determining, by the processor, a force allocation for the foot;
   causing, by the processor, the foot to act on the surface with the force allocation;
   determining, by the processor, a measured yaw for the body based on the determined yaw axis slip of the foot;
   determining, by the processor, a target yaw for the body, the target yaw between the measured yaw for the body and the requested yaw for the body; and
   causing, by the processor, the foot to rotate the body to the target yaw for the body.

2. The method of claim 1, wherein the robot is a biped robot.

3. The method of claim 1, wherein determining the force allocation for the foot comprises reducing a yaw axis moment component of the force allocation.

4. The method of claim 3, wherein reducing the yaw axis moment component of the force allocation comprises reducing a yaw axis moment of the foot with respect to a hip of the robot, wherein the hip is coupled to the foot by the leg of the robot.

5. The method of claim 1, wherein determining the force allocation for the foot comprises increasing a forward shear force component or lateral shear force component of the force allocation.

6. A method comprising:
  determining, by a processor of a robot, a yaw axis slip of a foot of the robot with respect to a surface in contact with the foot, the robot comprising:
    a body; and
    a leg coupling the foot to the body;
  based on the determined yaw axis slip of the foot and a requested yaw for the body of the robot, determining, by the processor, a force allocation for the foot; and
  causing, by the processor, the foot to act on the surface with the force allocation,
  wherein determining the yaw axis slip of the foot comprises:
    detecting, by a first set of sensors, a first yaw axis rotation of the body of the robot with respect to the foot;
    detecting, by a second set of sensors, a second yaw axis rotation of the body with respect to the surface;
    determining that a difference between the first yaw axis rotation and the second yaw axis rotation exceeds a rotation threshold; and
    based on the difference between the first yaw axis rotation and the second yaw axis rotation exceeding the rotation threshold, determining that there has been a yaw axis slip of the foot.

7. The method of claim 6, wherein the rotation threshold is between 0.1 and 0.5 radians.

8. The method of claim 1, further comprising:
  determining, by the processor, a relative control priority for each of six degrees of freedom of movement for the robot; and
  based on the yaw axis slip of the foot, updating, by the processor, the relative control priorities for each of the six degrees of freedom,
  wherein determining the force allocation for the foot is based on the relative control priorities and the updated relative control priorities.

9. A robot comprising:
  a body;
  a leg;
  a foot coupled to the body by the leg;
  a processor;
  a non-transitory computer readable medium; and
  program instructions stored on the non-transitory computer readable medium that, when executed by the processor, cause the robot to perform operations comprising:
    determining a yaw axis slip of the foot with respect to a surface, wherein the foot is in contact with the surface;
    determining a requested yaw for the body;
    based on the determined yaw axis slip of the foot and the requested yaw for the body, determining a force allocation for the foot;
    causing the foot to act on the surface with the force allocation;
    determining a measured yaw for the body based on the determined yaw axis slip of the foot;
    determining a target yaw for the body, the target yaw for the body between the measured yaw for the body and the requested yaw for the body; and
    causing the foot to rotate the body to the target yaw for the body.

10. The robot of claim 9, wherein the robot is a biped robot.

11. The robot of claim 9, wherein determining the force allocation for the foot comprises reducing a yaw axis moment component of the force allocation.

12. The robot of claim 11, wherein reducing the yaw axis moment component of the force allocation comprises reducing a yaw axis moment of the foot with respect to a hip of the robot, wherein the hip is coupled to the foot by the leg.

13. The robot of claim 9, wherein determining the force allocation for the foot comprises increasing a forward shear force component or lateral shear force component of the force allocation.

14. A robot comprising:
  a body;
  a leg;
  a foot coupled to the body by the leg;
  a processor;
  a non-transitory computer readable medium; and
  program instructions stored on the non-transitory computer readable medium that, when executed by the processor, cause the robot to perform operations comprising:
    determining a yaw axis slip of the foot with respect to a surface, wherein the foot is in contact with the surface;
    based on the determined yaw axis slip of the foot and the requested yaw for the body, determining a force allocation for the foot; and
    causing the foot to act on the surface with the force allocation,
    wherein determining the yaw axis slip of the foot comprises:
      detecting, by a first set of sensors, a first yaw axis rotation of the body with respect to the foot;
      detecting, by a second set of sensors, a second yaw axis rotation of the body with respect to the surface;
      determining that a difference between the first yaw axis rotation and the second yaw axis rotation exceeds a rotation threshold; and
      based on the difference between the first yaw axis rotation and the second yaw axis rotation exceeding the rotation threshold, determining that there has been a yaw axis slip of the foot.

15. The robot of claim 14, wherein the rotation threshold is between 0.1 and 0.5 radians.

16. The robot of claim 9, wherein movement of the robot has six degrees of freedom, and wherein the operations further comprise:
  determining a relative control priority for each of the six degrees of freedom; and
  based on the yaw axis slip of the foot, updating the relative control priorities for each of the six degrees of freedom,
  wherein determining the force allocation for the foot is based on the relative control priorities and the updated relative control priorities.

17. An article of manufacture including a non-transitory computer-readable medium, having stored thereon program instructions that, upon execution by a processor of a robot, cause the robot to perform operations comprising:
  determining a yaw axis slip of a foot of the robot with respect to a surface, wherein the foot is in contact with the surface;
  determining a requested yaw for a body of the robot;
  based on the determined yaw axis slip of the foot and the requested yaw for the body of the robot, determining a force allocation for the foot;

causing the foot to act on the surface with the force allocation;

determining a measured yaw for the body based on the determined yaw axis slip of the foot;

determining a target yaw for the body, the target yaw for the body between the measured yaw for the body and the requested yaw for the body; and causing the foot to rotate the body to the target yaw for the body.

18. The article of manufacture of claim 17, wherein determining the force allocation for the foot comprises reducing a yaw axis moment component of the force allocation.

* * * * *